US011718936B2

(12) United States Patent  
Nordstrom (10) Patent No.: US 11,718,936 B2  
(45) Date of Patent: Aug. 8, 2023

(54) VISION-GUIDED STITCHING SYSTEMS AND LOGIC FOR FABRICATING ENGINEERED TEXTILES WITH INTERSTITCHED SUPERPOSED WIRES

(71) Applicant: NIKE, Inc., Beaverton, OR (US)

(72) Inventor: Matthew D. Nordstrom, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 18/066,304

(22) Filed: Dec. 15, 2022

(65) Prior Publication Data

US 2023/0109805 A1    Apr. 13, 2023

Related U.S. Application Data

(62) Division of application No. 17/085,297, filed on Oct. 30, 2020, now Pat. No. 11,555,264.

(60) Provisional application No. 62/929,499, filed on Nov. 1, 2019.

(51) Int. Cl.
| | | |
|---|---|---|
| *D05B 19/14* | (2006.01) | |
| *A43B 5/00* | (2022.01) | |
| *A43B 23/02* | (2006.01) | |

(52) U.S. Cl.
CPC ............ *D05B 19/14* (2013.01); *A43B 5/00* (2013.01); *A43B 23/025* (2013.01); *A43D 2200/10* (2013.01); *D05D 2203/00* (2013.01)

(58) Field of Classification Search
CPC .......... D05B 23/00; D05B 19/14; B25J 11/00; D05D 2203/00
See application file for complete search history.

(56) References Cited

U.S. PATENT DOCUMENTS

| | | | | | |
|---|---|---|---|---|---|
| 5,381,743 | A | * | 1/1995 | Moll | D05B 23/00 112/470.13 |
| 5,400,730 | A | * | 3/1995 | Moll | D05B 59/04 112/168 |
| 2018/0080155 | A1 | * | 3/2018 | Sano | D05B 87/00 |

(Continued)

FOREIGN PATENT DOCUMENTS

EP          3549470 A1 * 10/2019   ......... A43B 1/0063

*Primary Examiner* — Nathan E Durham  
(74) *Attorney, Agent, or Firm* — Quinn IP Law (57) ABSTRACT

Presented are automated manufacturing systems for fabricating engineered textiles, footwear and apparel formed with such engineered textiles, methods for making such engineered textiles, and memory-stored, processor-executable instructions for operating such manufacturing systems. An automated manufacturing system constructs engineered textiles from workpieces composed of superposed, unwoven wires. The system includes a movable end effector bearing a stitching head and an image capture device. The stitching head has a thread feeder and sewing needle to generate stitches. The image capture device captures images of the workpiece and outputs data indicative thereof. A system controller receives this image capture device data and locates, from the captured image of the workpiece, gaps defined between quadrangles of the superposed wires. The controller commands the end effector to sequentially move the stitching head and thereby align the sewing needle with the gaps, and commands the stitching head to insert a succession of stitches within these gaps.

20 Claims, 5 Drawing Sheets

(56) References Cited

U.S. PATENT DOCUMENTS

2018/0271216 A1 9/2018 La O' et al.
2018/0279719 A1 10/2018 Andon et al.

* cited by examiner

VISION-GUIDED STITCHING SYSTEMS AND LOGIC FOR FABRICATING ENGINEERED TEXTILES WITH INTERSTITCHED SUPERPOSED WIRES

CLAIM OF PRIORITY AND CROSS-REFERENCE TO RELATED APPLICATIONS

This application is a divisional of U.S. patent application Ser. No. 17/085,297, which was filed on Oct. 30, 2022, is now allowed, and claims priority to U.S. Provisional Patent Application No. 62/929,499, which was filed on Nov. 1, 2019. Both of the foregoing applications are incorporated herein by reference in their respective entireties and for all purposes.

TECHNICAL FIELD

The present disclosure relates generally to engineered textiles. More specifically, aspects of this disclosure relate to systems, methods, and devices for automated fabrication of engineered textiles for footwear and apparel.

BACKGROUND

Articles of footwear, such as shoes, boots, slippers, sandals, and the like, are generally composed of two primary elements: an upper for securing the footwear to a user's foot; and a sole for providing subjacent support to the foot. Uppers may be fabricated from a variety of materials, including textiles, polymers, natural and synthetic leathers, etc., that are stitched or bonded together to form a shell or harness for securely receiving a foot. Many sandals and slippers, for example, have an upper with an open toe and/or open heel construction. Some designs employ an upper that is limited to a series of straps that extend over the user's instep and, optionally, around the ankle. Conversely, boot and shoe designs employ a full upper with a closed toe and heel construction that encases the foot. An ankle opening through a rear quarter portion of the upper provides access to the footwear's interior, facilitating entry and removal of the foot into and from the upper. A shoelace or strap system may be utilized to secure the foot within the upper.

A sole structure is mounted to the underside of the upper, positioned between the user's foot and the ground. In many articles of footwear, including athletic shoes and boots, the sole structure is a layered construction that generally incorporates a comfort-enhancing insole, an impact-mitigating midsole, and a surface-contacting outsole. The insole, which may be located partially or entirely within the upper, is a thin and compressible member that provides a contact surface for the underside "plantar" region of the user's foot. By comparison, the midsole is mounted underneath the insole, forming a middle layer of the sole structure. In addition to attenuating ground reaction forces, the midsole may help to control foot motion and impart enhanced stability. Secured underneath the midsole is an outsole that forms the ground-contacting portion of the footwear. The outsole is usually fashioned from a durable, waterproof material that includes tread patterns engineered to improve traction.

Footwear that employ a full upper with a closed toe/heel design will conventionally take on multilayer constructions that are formed by joining together a variety of cutout sheet material elements. These sheet elements may be selected to impart wear-resistance, moisture-control, stretchability, flexibility, air-permeability, comfort, etc., to different areas of the upper. To fabricate the upper, the individual elements are first cut from sheet stock to desired shape, and then joined together through stitching, adhesive bonding, or other suitable joining technique. The sheet elements are often joined in an overlapping or layered configuration to impart multiple properties to individual areas. As the number and type of sheet elements incorporated into the upper increases, the time and expense associated with transporting, stocking, cutting, and joining the elements increases proportionately. Waste material from these manufacturing processes also accumulates to a greater degree with the increase in the number and type of sheet elements incorporated into an upper. Moreover, recycling an article of footwear becomes increasingly more difficult for uppers manufactured from a large number of individual sheet elements.

SUMMARY

Presented herein are automated manufacturing systems with attendant control logic for fabricating engineered textiles, footwear and apparel formed, in whole or in part, from such engineered textiles, methods for making such engineered textiles, and memory-stored, processor-executable instructions for operating such manufacturing systems. By way of example, and not limitation, there are disclosed engineered textiles composed of superposed, unwoven wires that are interconnected, e.g., via an array of interleaved stitch seams or other joining techniques. The resultant textile does not require and, thus, may eliminate a subjacent support scrim or layer of fabric. In contrast to conventional designs, at least some of the disclosed engineered textiles are neither woven nor knitted; rather, individual strands may extend in two, three, or more directions and joined to one another at multiple predefined locations, e.g., via bonding agents, fasteners, adhesives, welding, etc.

During assembly, the superposed wires may be wound around and retained in tension by the posts of a workpiece frame (or "jig") to align the wires in an intercrossed pattern. One set of mutually parallel wire windings is elongated in a first direction, e.g., aligned with a first pre-defined load path, and another set of mutually parallel wire windings is elongated in a second direction e.g., aligned with a second pre-defined load path that is angled with respect to the first direction. Third, fourth, fifth, etc., sets may each be elongated in a respective direction that is distinct from the other sets. The first set of wire windings may be laid across and abut the second set of wire windings without interlacing the two sets of windings. To maintain a desired shape of the engineered textile, while permitting inter-wire movement, the two sets of wire windings are mechanically joined by first (top) and second (bobbin) threads lockstitched together in the gaps between the superposed wires. The lockstitched threads may be arranged in a matrix of orthogonal rows and columns, which interleave with and abut against the wires. Alternatively, the wire windings may be joined via adhesives, fasteners, fusing, etc.

Assembling the above-mentioned engineered textiles may be complicated by a variety of considerations, including retaining the superposed wires in tension while joining them together, and joining the wires in a manner that allows for wire-on-wire translation while preventing the textile from losing shape or becoming tangled once removed from the jig. Other complications may include preventing wire movement during stitching, locating a central gap defined between each quadrangle of crisscrossed wires, and precision lockstitching together the top and bobbin threads in these central gaps, etc. To address any one or more or all of the foregoing issues, an automated manufacturing system is presented that employs a jig for maintaining wire positioning and tension, and a vision or laser-guided stitching head for precision locating of interwire gaps and interconnecting the superposed wires. For some implementations, the automated manufacturing system may utilize a precision positioning apparatus with a laser-based alignment sensor to hold, orient, and dynamically position the jig and, thus, the superposed wires. Additionally, or alternatively, a stitching end effector with a stitching head and a high-precision digital camera is mounted to a robot arm or carriage for controller-automated, vision guided stitching of the superposed wires.

Aspects of this disclosure are directed to controller-regulated, vision-guided stitching systems for assembling engineered textiles. In an example, an automated manufacturing system is presented for constructing an engineered textile from a workpiece composed of superposed wires. By way of contrast to existing sewing systems that are delimited to stitching together woven fabrics cutouts, polymeric sheets, natural and synthetic leather panels, etc., this automated manufacturing system is generally intended to mechanically connect an unwoven, intercrossed array of wire windings. These windings may be formed from any suitable natural or synthetic material, including extruded elastic and inelastic polymers, braided fibers, combinations thereof, and the like. The automated manufacturing system includes a movable end effector, such as a pneumatic articulating robot arm or a motor-driven carriage. A stitching head, which is mounted to the movable end effector, includes one or more thread feeders and a sewing needle that cooperatively generate stitches. Also mounted to the movable end effector is an image capture device that captures images of the workpiece and outputs data indicative thereof.

Continuing with the discussion of the above example, the automated manufacturing system also includes a resident or remote system controller, which may be embodied as an electronic control unit or a network of distributed controllers or control modules, for regulating operation of one or more resident processing systems. The system controller is wired or wirelessly connected to the movable end effector, stitching head, and image capture device. This controller is programmed to receive, from the image capture device, the data indicative of the captured image of the workpiece, and locate, from the captured image, multiple gaps each defined between a quadrangle of the superposed wires. Once the interwire gaps are located, the system controller transmits one or more command signals to the movable end effector to sequentially move the stitching head across the workpiece and thereby align the sewing needle with each of the identified gaps. The system controller concurrently transmits one or more command signals to the stitching head to insert a succession of stitches within the gaps between the superposed wires.

Other aspects of this disclosure are directed to footwear, apparel, sporting goods, and other consumer products fabricated with any of the disclosed engineered textiles. As an example, an article of footwear is presented that includes an upper designed to receive and attach to a foot of a user, and a sole structure that is attached to the upper and designed to support thereon the user's foot. The upper is fabricated, in whole or in part, from an engineered textile and, thus, includes one or more upper segments that are manufactured from engineered textiles. The engineered textile may include a first set of mutually parallel wire windings elongated in a first direction, and a second set of mutually parallel wire windings elongated in a second direction that is distinct from (e.g., obliquely angled or substantially orthogonal to) the first direction. The first and second sets of wire windings are superposed such that the first set abuts the second set in an unwoven, intercrossed pattern defining an array of quadrangles each having a central gap. First (top) and second (bobbin) threads are elongated in a third and, optionally, a fourth direction that are respectively parallel with respect to the first and second directions. In another embodiment, the first and second threads may define a third direction that is oblique and/or orthogonal to the first and second directions. These two threads are lockstitched together with a respective lockstitch disposed in each central gap between intercrossed wire windings.

Additional aspects of the present disclosure are directed to techniques, algorithms, and logic for operating any of the disclosed systems or for manufacturing any of the disclosed engineered textiles. For instance, non-transitory, computer-readable media (CRM) are presented that store instructions executable by one or more processors of a system controller of an automated manufacturing system. These instructions cause the automated manufacturing system to perform a set of system operations, including receiving, from an image capture device mounted to a movable end effector, data indicative of a captured image of a workpiece. The workpiece is composed of multiple unwoven, superposed wire windings, e.g., aligned in a crisscross pattern. The movable end effector also has mounted thereto a stitching head with a thread feeder and a sewing needle that are cooperatively configured to generate stitches. The stored instructions also cause the system to locate, from the captured image of the workpiece, multiple gaps defined between individual quadrangles of the superposed, intercrossed wires. One or more command signals are sent to the movable end effector to sequentially move the stitching head and thereby align the sewing needle with each of the gaps. In addition, one or more command signals are sent to the stitching head to insert a succession of stitches within the gaps between the superposed wires.

Additional aspects of this disclosure are directed to methods for manufacturing any of the disclosed engineered textiles and methods for controlling any of the disclosed systems and devices. In an example, a method is presented for operating an automated manufacturing system for constructing an engineered textile from a workpiece composed of superposed wires. This representative method includes, in any order and in any combination with any of the above or below disclosed features and options: receiving, via a system controller from an image capture device mounted to a movable end effector, data indicative of a captured image of a workpiece, the movable end effector having mounted thereto a stitching head with a thread feeder and a sewing needle cooperatively configured to generate stitches; locating, via the system controller from the captured image of the workpiece, multiple gaps each defined between a quadrangle of the superposed wires; commanding, via the system controller, the movable end effector to sequentially move the stitching head and thereby align the sewing needle with each of the gaps; and commanding, via the system controller, the stitching head to insert a succession of stitches within the gaps between the superposed wires.

For any of the disclosed manufacturing systems, methods, and CRM, the system controller may identify, within the captured image of the workpiece, respective sets of intersecting points (e.g., four points per set) of the superposed wires defining the quadrangles. The controller then determines, within each respective set, a center of a respective diagonal line segment connecting an opposing pair of the intersecting points. In this instance, locating the quadrangle gaps includes designating the center of the diagonal line segment of each set of intersecting points as one of the gaps. As another option, the system controller may identify, within the captured workpiece image, a respective estimated centerline for each superposed wire, and construct the quadrangles of the superposed wires from these estimated centerlines. In this instance, locating the gaps includes designating a central region within each of the quadrangles between the estimated centerlines as one of the gaps. Optionally, the system controller may identify, within the captured image, at least two intersecting points of the superposed wires each defining a respective corner of a quadrangle, and determine a central region for each quadrangle at a calibrated angle from a line segment connecting the two respective corners and a calibrated distance from one of the corners. In this instance, locating the gaps includes designating the central region of each quadrangle as one of the gaps.

For any of the disclosed manufacturing systems, methods, and CRM, the system controller may derive, calculate, retrieve, or look-up (hereinafter "determine") path plan data for the stitching head to insert the succession of stitches within the gaps between the superposed wires. The path plan data includes a path origin, a path destination, and a stitch route for traversing the stitching head from the origin to the destination. As part of this procedure, the system controller may optionally generate a trace of the stitch route, determine start and end positions within the captured image of the workpiece, and superimpose the stitch route trace onto the captured image with the origin overlapping the start position and the destination overlapping the end position. the system controller may then determine multiple calibrated alignment points on the stitch route, determine a respective displacement, if any, between each calibrated alignment point and a respective alignment location in the workpiece image, and determine a respective trace correction to offset each respective displacement.

For any of the disclosed engineered textiles, CRM, manufacturing systems and methods, the manufacturing system may be equipped with a workpiece frame that is structurally configured to retain the superposed wires in a tensioned, crisscrossed pattern. The workpiece frame may be fabricated with multiple adjoining casing walls that define therebetween an inner frame space across which the workpiece is stretched. A series of posts project, e.g., substantially orthogonally, from the casing walls, with the posts spaced from one another along the perimeter of the inner frame space. In this instance, the wires are wound around and suspended from the posts.

For any of the disclosed manufacturing systems, methods, and CRM, the manufacturing system may be equipped with one or more sensors that track, in real-time, the movement of the stitching head relative to a calibrated origin position. The system controller may optionally receive one or more sensor signals from one or more position sensors indicative of real-time positions of the stitching head. From the received sensor signal(s) and captured workpiece image(s), the controller may determine an estimated distance between each real-time position of the stitching head and a next adjacent one of the gaps. In this instance, commanding the movable end effector to sequentially move the stitching head includes estimating multiple desired trajectories each based on the estimated distance between a real-time position of the stitching head and a respective next adjacent gap. The system controller may concurrently determine, one-at-a-time in real-time from the received sensor signal(s) and captured workpiece image(s), a respective next adjacent gap closest to each real-time position of the stitching head.

For any of the disclosed engineered textiles, CRM, manufacturing systems and methods, the stitching head may be equipped with a needle receiver that is operable to reciprocally translate the sewing needle, a bobbin case that is operable to feed bobbin thread, and a shuttle hook that is operable to create a lockstitch between the bobbin thread and a top thread fed from the thread feeder. For some system configurations, the movable end effector is comprised of a support frame attached to a robot arm. Alternatively, the movable end effector is comprised of a support carriage attached to a slide track frame.

The above summary does not represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

Aspects of the present disclosure broadly relate to an article of footwear formed using one or more non-woven engineered textiles, and manufacturing methods for creating such textiles. In general, the engineered textiles of the present disclosure are comprised of a plurality of tensile strands that may be selectively positioned and oriented along certain specified load paths such that the textile may predictably respond during certain functional activities. Because the textile is formed without a weave, material integrity may devolve into a spaghetti-like mess of strands absent some manner of joining adjacent layers. As such, the present disclosure broadly relates to manners of adaptively joining adjacent layers of obliquely angled tensile strands absent a weave. As described, it is preferred that the manner of joining permits some degree of relative wire movement, as opposed to rigidly locking all strands into a rigid alignment. This local movement may allow the textile to move and respond any flexure of the wearer's body throughout the functional activity while still maintaining overall material integrity. While the present disclosure primarily describes joining via a lock stitch at wire intersection points, such should be regarded as merely an example unless so limited by the claims.

This disclosure is susceptible of embodiment in many different forms. Representative examples of the disclosure are shown in the drawings and will be described in detail herein with the understanding that these representative examples are provided as an exemplification of the disclosed principles, not limitations of the broad aspects of the disclosure. To that extent, elements and limitations that are described in the Abstract, Technical Field, Background, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including", "comprising", "having", "containing", and the like shall each mean "including without limitation." Moreover, words of approximation, such as "about," "almost," "generally", "substantially", "approximately", and the like, may be used herein in the sense of "at, near, or nearly at," or "within 0-5% of," or "within acceptable manufacturing tolerances", or any logical combination thereof, for example. Lastly, directional adjectives and adverbs, such as fore, aft, medial, lateral, proximal, distal, vertical, horizontal, front, back, left, right, etc., may be with respect to an article of footwear when worn on a user's foot and operatively oriented with a ground-engaging bottom surface of the sole structure seated on a flat surface, for example.

Figure 1A:
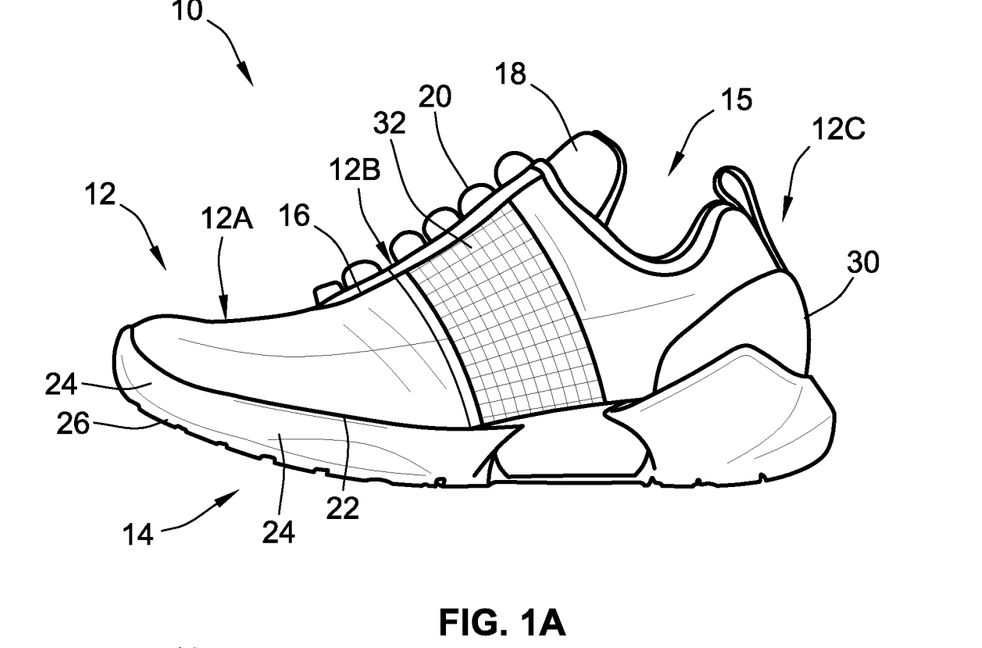
FIG. 1A is a lateral, side-view illustration of a representative article of footwear with one or more engineered textile upper segments in accordance with aspects of the present disclosure.

Referring now to the drawings, wherein like reference numbers refer to like features throughout the several views, there is shown in FIG. 1A a representative article of footwear, which is designated generally at 10 and portrayed herein for purposes of discussion as an athletic shoe or "sneaker". The illustrated article of footwear 10—also referred to herein as "footwear" or "shoe" for brevity—is an exemplary application with which novel aspects and features of this disclosure may be practiced. In the same vein, implementation of the present concepts by the illustrated automated manufacturing system should also be appreciated as a representative implementation of the disclosed concepts. It will therefore be understood that aspects of this disclosure may be integrated into other footwear designs, may be incorporated into any logically relevant type of consumer product, and may be carried out by other automated manufacturing system architectures. As used herein, the terms "shoe" and "footwear", including permutations thereof, may be used interchangeably and synonymously to reference any suitable type of garment worn on a human foot. Lastly, features presented in the drawings are not necessarily to scale and are provided purely for instructional purposes. Thus, the specific and relative dimensions shown in the drawings are not to be construed as limiting.

Figure 1B:
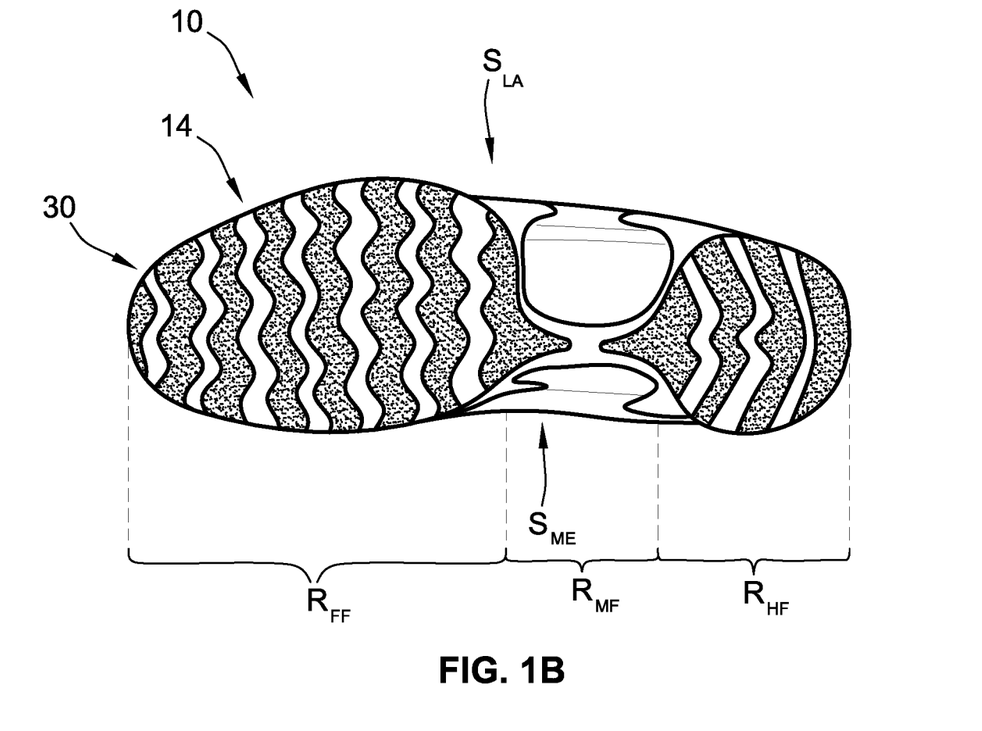
FIG. 1B is a bottom-view illustration of the representative article of footwear of FIG. 1A.

The representative article of footwear 10 is generally depicted in FIGS. 1A and 1B as a bipartite construction that is primarily composed of a foot-receiving upper 12 mounted on top of a subjacent sole structure 14. For ease of reference, footwear 10 may be divided into three anatomical regions: a forefoot region $R_{FF}$, a midfoot region $R_{MF}$, and a hindfoot (heel) region $R_{HF}$, as shown in FIG. 1. Footwear 10 may also be divided along a vertical plane into a lateral segment $S_{LA}$—a distal half of the shoe 10 farthest from the sagittal plane of the human body—and a medial segment $S_{ME}$—a proximal half of the shoe 10 closest to the sagittal plane of the human body. In accordance with recognized anatomical classification, the forefoot region $R_{FF}$ is located at the front of the footwear 10 and generally corresponds with the phalanges (toes), metatarsals, and any interconnecting joints thereof. Interposed between the forefoot and hindfoot regions $R_{FF}$ and $R_{HF}$ is the midfoot region $R_{MF}$, which generally corresponds with the cuneiform, navicular and cuboid bones (i.e., the arch area of the foot). Hindfoot region $R_{HF}$, in contrast, is located at the rear of the footwear 10 and generally corresponds with the talus (ankle) and calcaneus (heel) bones. Both lateral and medial segments $S_{LA}$ and $S_{ME}$ of the footwear 10 extend through all three anatomical regions $R_{FF}$, $R_{MF}$, $R_{HF}$, and each corresponds to a respective transverse side of the footwear 10. While only a single shoe 10 for a left foot of a user is shown in FIGS. 1A and 1B, a mirrored, substantially identical counterpart for a left foot of a user may be provided. Recognizably, the shape, size, material composition, and method of manufacture of the shoe 10 may be varied, singly or collectively, to accommodate practically any conventional or nonconventional footwear application.

With reference again to FIG. 1A, the upper 12 is depicted as having a shell-like closed toe and heel configuration for encasing a human foot. Upper 12 of FIG. 1A is generally defined by three adjoining sections, namely a toe box 12A, a vamp 12B and a rear quarter 12C. The toe box 12A is shown as a rounded forward tip of the upper 12 that extends from distal to proximal phalanges to cover and protect the user's toes. By comparison, the vamp 12B is an arched midsection of the upper 12 that is located aft of the toe box 12A and extends from the metatarsals to the cuboid. As shown, the vamp 12B also provides a series of lace eyelets 16 and a shoe tongue 18. Positioned aft of the vamp 12B is a rear quarter 12C that extends from the transverse tarsal joint to wrap around the calcaneus bone, and includes the rear end and rear sides of the upper 12. While portrayed in the drawings as comprising three primary segments, the upper 12 may be fabricated as a single-piece construction or may be composed of any number of segments, including a toe shield, heel cap 30, ankle cuff, interior liner, etc. For sandal and slipper applications, the upper 12 may take on an open toe or open heel configuration, or may be replaced with a single strap or multiple interconnected straps.

The upper 12 portion of the footwear 10 may be fabricated from any one or combination of a variety of materials, such as textiles, engineered foams, polymers, natural and synthetic leathers, etc. Individual segments of the upper 12, once assembled or cut to shape and size, may be stitched, adhesively bonded, fastened, welded or otherwise joined together to form an interior void for comfortably receiving a foot. The individual material elements of the upper 12 may be selected and located with respect to the footwear 10 in order to impart desired properties of durability, air-permeability, wear-resistance, flexibility, appearance, and comfort, for example. An ankle opening 15 in the rear quarter 12C of the upper 12 provides access to the interior of the shoe 10. A shoelace 20, strap, buckle, or other commercially available mechanism may be utilized to modify the girth of the upper 12 to more securely retain the foot within the interior of the shoe 10 as well as to facilitate entry and removal of the foot from the upper 12. Shoelace 20 may be threaded through a series of eyelets 16 in or attached to the upper 12; the tongue 18 may extend between the lace 20 and the interior void of the upper 12.

Sole structure 14 is rigidly secured to the upper 12 such that the sole structure 14 extends between the upper 12 and a support surface upon which a user stands. In effect, the sole structure 14 functions as an intermediate support platform that separates and protects the user's foot from the ground. In addition to attenuating ground reaction forces and providing cushioning for the foot, sole structure 14 of FIGS. 1A and 1B may provide traction, impart stability, and help to limit various foot motions, such as inadvertent foot inversion and eversion. It is envisioned that the sole structure 14 may be attached to the upper 12 via any presently available or hereinafter developed suitable means. For at least some applications, the upper 12 may be coupled directly to the midsole 24 and, thus, lack a direct coupling to either the insole 22 or the outsole 26. By way of non-limiting example, the upper 12 may be adhesively attached to only an inside periphery of a midsole sidewall 21, e.g., secured with a 10 mm bonding allowance via priming, cementing, and pressing.

In accordance with the illustrated example, the sole structure 14 is fabricated as a sandwich structure with a foot-contacting insole 22 (FIG. 1A), an intermediate midsole 24, and a bottom-most outsole 26. Alternative sole structure configurations may be fabricated with greater or fewer than three layers. Insole 22 is located within an interior void of the footwear 10, operatively located at a lower portion of the upper 12, such that the insole 22 abuts a plantar surface of the foot. Underneath the insole 22 is a midsole 24 that incorporates one or more materials or embedded elements that enhance the comfort, performance, and/or ground-reaction-force attenuation properties of footwear 10. These elements and materials may include, individually or in any combination, a polymer foam material, such as polyurethane or ethyl vinyl acetate (EVA), filler materials, moderators, air-filled bladders, plates, lasting elements, or motion control members. Outsole 26 is located underneath the midsole 24, defining only some or all of the bottom-most, ground-engaging portion of the footwear 10. The outsole 26 may be formed from a natural or synthetic rubber material that provides a durable and wear-resistant surface for contacting the ground. In addition, the outsole 26 may be contoured and textured to enhance the traction (i.e., friction) properties between footwear 10 and the underlying support surface.

Figure 2:
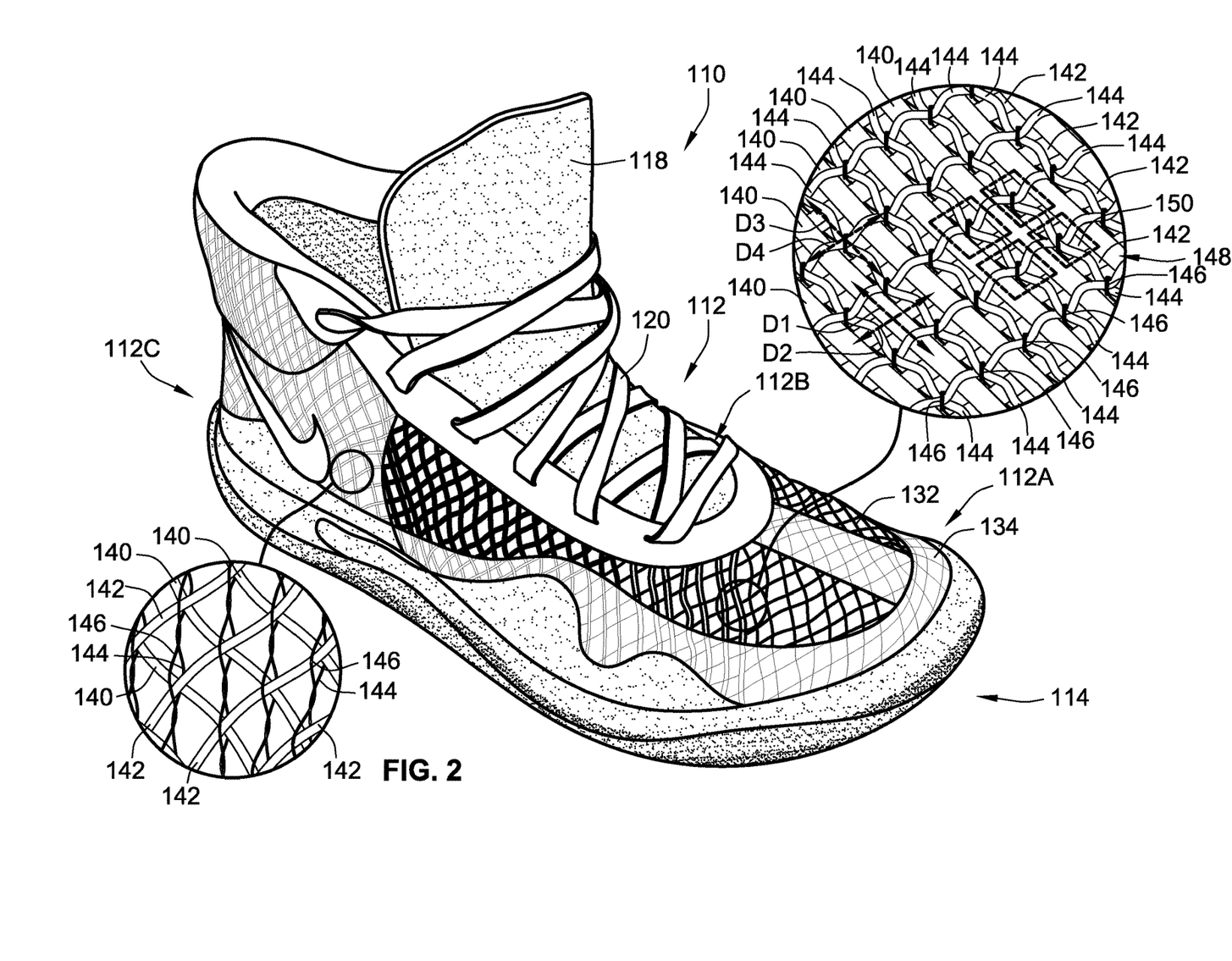
FIG. 2 is an elevated, perspective-view illustration of a representative athletic shoe with an engineered textile upper in accord with aspects of the disclosed concepts.

With reference now to FIG. 2, there is shown another representative article of footwear, which is designated generally at 110 and portrayed herein for purposes of discussion as an athletic shoe of the basketball type. Although differing in appearance, the athletic shoe 110 of FIG. 2 may take on any of the features, options, and alternatives described above with respect to the footwear 10 presented in FIGS. 1A-1B, and vice versa. For instance, the athletic shoe 110 of FIG. 2 includes a foot-securing upper 112 that is seated on top of a foot-supporting sole structure 114. Athletic shoe 110 is also assembled with an elongated tongue 118 that extends between a shoelace 120 and an interior foot-receiving void of the upper 112. By way of comparison, the footwear 10 of FIG. 1A is assembled with one or more discrete upper sections, such as midfoot vamp section 32, each fabricated from an engineered textile formed from superposed, inter-stitched wires. Footwear 110 of FIG. 2, on the other hand, is assembled with an upper 112 having an outer surface that is fabricated almost entirely from the engineered textile material 132. In particular, the engineered textile 132 surface of upper 112 extends from a forward edges of the toe box 112A, through both sides of the vamp section 112B, and around the rear quarter 112C. An optional translucent scrim layer 134 extends across and covers select sections of the upper's 112 engineered textile 132 surface, providing structural reinforcement to those select segments of the upper 112.

Inset within FIG. 2 are enlarged illustrations of the engineered textile 132 used to fabricate the exterior surface of the footwear upper 112. In accord with the illustrated example, the engineered textile 132 generally comprises or, for at least some implementations, consists essentially of two sets of wire windings 140 and 142 that are interconnected via an array of interleaved stitch seams formed from opposing threads 144 and 146. The windings of the first set of wire windings 140 are substantially parallel to one another and all elongated in a first direction D1, e.g., corresponding to a first pre-defined load path. In the same vein, the windings of the second set of wire windings 140 are substantially parallel to one another and all elongated in a second direction D2, which may be generally orthogonal to the first direction D1 and may correspond to a second pre-defined load path. While shown arranged in a square array of perpendicular rows and columns, it is envisioned that the first set of wire windings 140 may be obliquely angled with respect to the second set of wire windings 142. These windings 140, 142 may be formed from an organic or inorganic material, including extruded elastic polymers, braided elastic fibers, inelastic polymer fibers, combinations thereof, and the like. In some embodiments, the strands 140, 142 may comprise one or more of an aliphatic or semi-aromatic polyamide fiber, such as PA6, PA66, an aromatic polyester fiber, such as VECTRAN®—manufactured by Kuraray Co., Ltd, an aramid fiber, such as KEVLAR®—manufactured by DuPont de Nemours, Inc, a polypropylene fiber or a high modulus polyethylene fiber. It may be desirable, depending on desired application, that the diameters of the windings 140, 142 be at least 50-75% larger or, in some embodiments, at least 100-200% larger or, in some embodiments, 3-times to 4-times larger than the diameters of the stitching threads 144, 146.

To help ensure that the wire windings 140, 142 are assembled in a manner that allows for relative wire movement and/or wire-on-wire translation, the first set of wire windings 140 are located on top of the second set of wire windings 142 in an abutting, non-woven manner. Rather than interlace the wire windings 140, 142 in an alternating over-under composition, as might be seen in a conventional woven textile sheet, the first set of wire windings 140 lays across an upper face of the second set of wire windings 142 in an unwoven, intercrossed pattern. In so doing, first wire windings 140 may translate and/or stretch in the first direction D1, and second wire windings 142 may translate and/or stretch in the second direction D2 independent of or contemporaneous with the translating/stretching first wire windings 140. Intersecting the wire windings 140, 142 in a crisscross arrangement defines an array of quadrangles, four of which are shown hidden in the upper righthand inset view of FIG. 2 and designated generally as 148. These quadrangles 148 are portrayed in the Figures as right-rectangular polygons; nevertheless, each quadrangle 148 may take on other shapes and sizes, which may be similar to or distinct from the quadrilateral shapes of the other quadrangles 148. At the midpoint of each quadrangle 148 is a central through hole or "interwire gap" 150.

The stacked wires 140, 142 are mechanically joined in a manner that maintains a desired perimeter shape of the assembled engineered textile 132, yet does not impede the above-described wire-on-wire movement. According to the illustrated example, a first thread 144—known in sewing parlance as the "top thread"—is interlaced with a second thread 146—known as the "bobbin thread"—through an automated stitching process in order to form an assortment of substantially linear stitch seams that are interleaved with and bind together the crisscrossed sets of wire windings 140, 142. The upper righthand inset view of FIG. 2 depicts one set of the linear stitch seams elongated in a third direction D3 that is substantially parallel with respect to the first direction D1 of the first wire set 140. An optional second set of the linear stitch seams is elongated in a fourth direction D4 that is substantially parallel with respect to the second direction D2 of the second wire set 142. Fashioning the first set of stitch seams may be achieved by drawing the first and second threads 144, 146 in the third direction D3 and sequentially lockstitching them together in the central gaps 150 between each grouping of intercrossed wires. Likewise, the second set of stitch seams may be fashioned by drawing the first and second threads 144, 146 in the fourth direction D4 and sequentially lockstitching them together in the central gaps 150 between each grouping of intercrossed wires. This process is systematically repeated along parallel trajectories aligned with the third and fourth directions D3 and D4 until a desired number of linear stitch seams is achieved. As seen in the lower left-hand inset view of FIG. 2, the interlocking threads 144, 146 may be drawn in directions that are oblique with respect to the intercrossed wires.

It should be recognized that the structural integrity of the engineered textile 132 may be optimized by placing a lockstitch inside each interwire gap 150; however, it is within the scope of this disclosure to place a lockstitch in every other gap 150 or in only selected ones of the gaps 150, e.g., using controller-automated, vision-guided stitching techniques. Optimized structural integrity may be further optimized by positioning a stitch seam between every pair of neighboring, parallel wire windings 140, 142. If desired, however, a seem may be placed between every other pair of neighboring windings 140, 142 or only select pairs of neighboring windings. In this regard, the subject disclosure is not per se limited to a particular type of stitch and, thus, may employ other conventional and unconventional stitch types, including chainstitches, lockstitches, overlock stitches, cover stitches, etc. As yet a further option, the windings 140, 142 and threads 144, 146 may be elongated along rectilinear paths, curvilinear paths, or any assorted combination of geometric paths.

Figure 3:
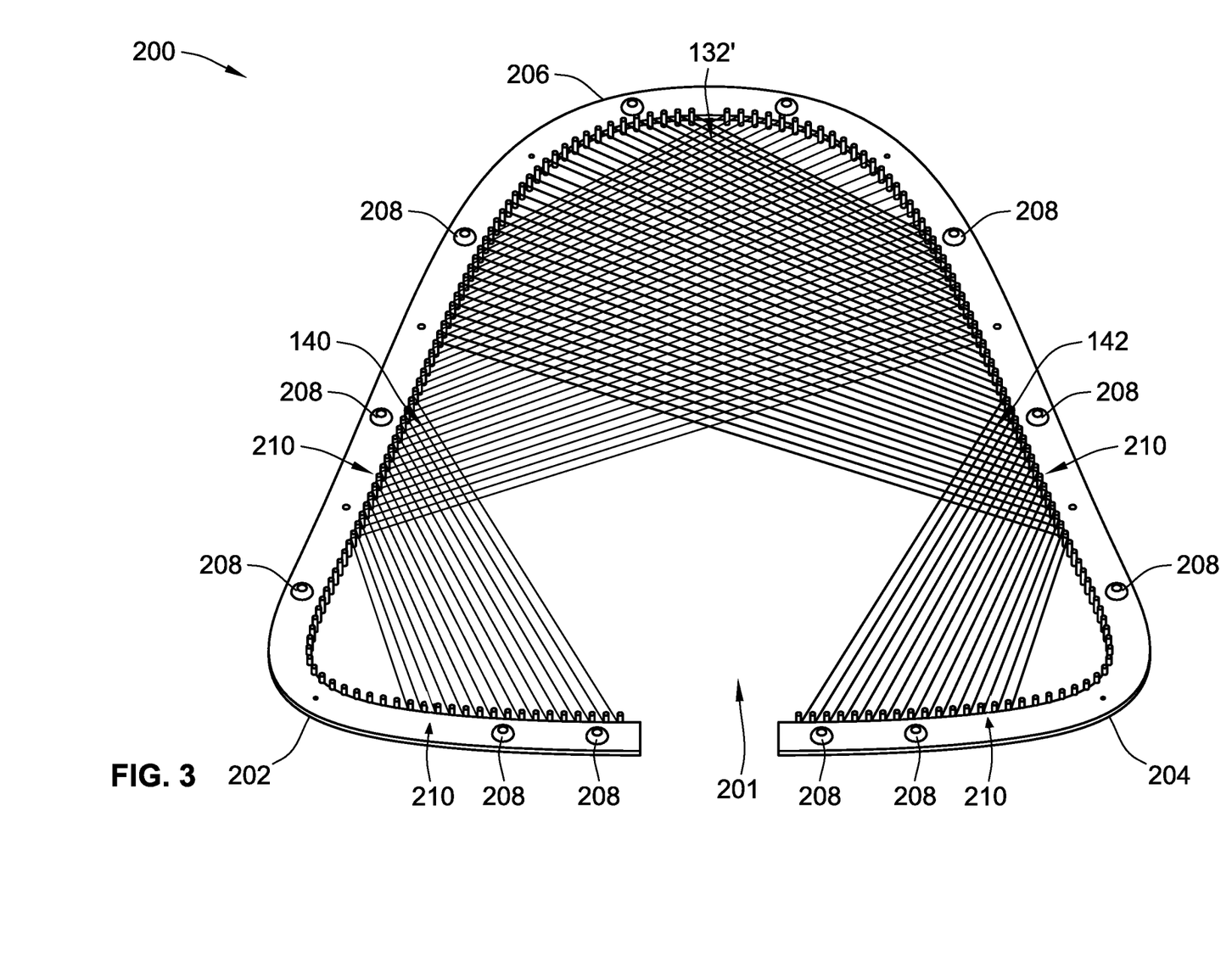
FIG. 3 is a plan-view illustration of a representative workpiece frame ("jig") retaining therein a representative workpiece composed of unwoven, superposed wires tensioned in a crisscrossed pattern.

To help retain the superposed wires in a tensioned state while concomitantly minimizing wire motion during the wire joining process, the superposed wire windings 140, 142 may be stretched taut across a workpiece frame 200 (also referred to herein as "jig") of FIG. 3. In accordance with the illustrated example, the workpiece frame 200 is composed of multiple frame walls, namely first, second and third casing walls 202, 204 and 206, respectively, that collectively define an inner frame space 201 across which the superposed, unwoven wires are stretched to form a workpiece 132'. The first and second casing walls 202, 204, which are generally straight and substantially colinear, may be connected to each other via the third wall 206, which is shown having an elongated, arcuate shape. In at least some desired implementations, the casing walls 202, 204, 206 are integrally formed as a single-piece, unitary structure with the first and second casing walls 202, 204 each projecting inward from a respective end of the third casing wall 206. Clearly, the shape and size of the workpiece frame 200 of FIG. 3 is purely representative by nature, and is therefore non-limiting in scope.

Spaced along the length of each casing wall 202, 204, 206 is a series of mechanical fastening features 208 (e.g., snap-fastener heads) for securing the workpiece frame 200 to a subjacent support surface, such as the assembly benchtop of a workstation table or a conveyor belt of a manufacturing system. Additionally, a series of cylindrical wire posts 210 projects generally orthogonally from the upper surface of each casing wall 202, 204, 206 for receiving the superposed wire workpiece 132'. Like the mechanical fastening features 208, the wire posts 210 are spaced from one another around the outer perimeter of the inner frame space 201. The unwoven, superposed wires 140, 142 are wound around these wire posts 210 to create the preliminary workpiece 132'. Incidentally, manufacturing the engineered textile 132 may necessitate locating the superposed wires 140, 142 in a tensioned, crisscrossed pattern on the workpiece frame 200 prior to joining of the wires 140, 142. Locating the superposed wires 140, 142 may include manually or robotically anchoring then winding a first discrete wire in a first zigzag pattern around a first select set of the posts 210, and subsequently anchoring then winding a second discrete wire in a second zigzag pattern around a second select set of the posts 210 such that the workpiece 132' is stretched across the inner frame space 201. The unwoven, overlapping wires 140, 142 may be joined together at multiple predefined locations, e.g., via stitching, bonding, fusing and/or fastening the wires. For a footwear application, the anchoring points of the individual wires, the direction or directions of elongation of the individual wires, the points of overlap of the wires, and/or the locations of joining the wires may be data mapped to an intended user or users foot/feet to provide, for example, improved foot retention, comfort, performance, energy return, etc.

Figure 4:
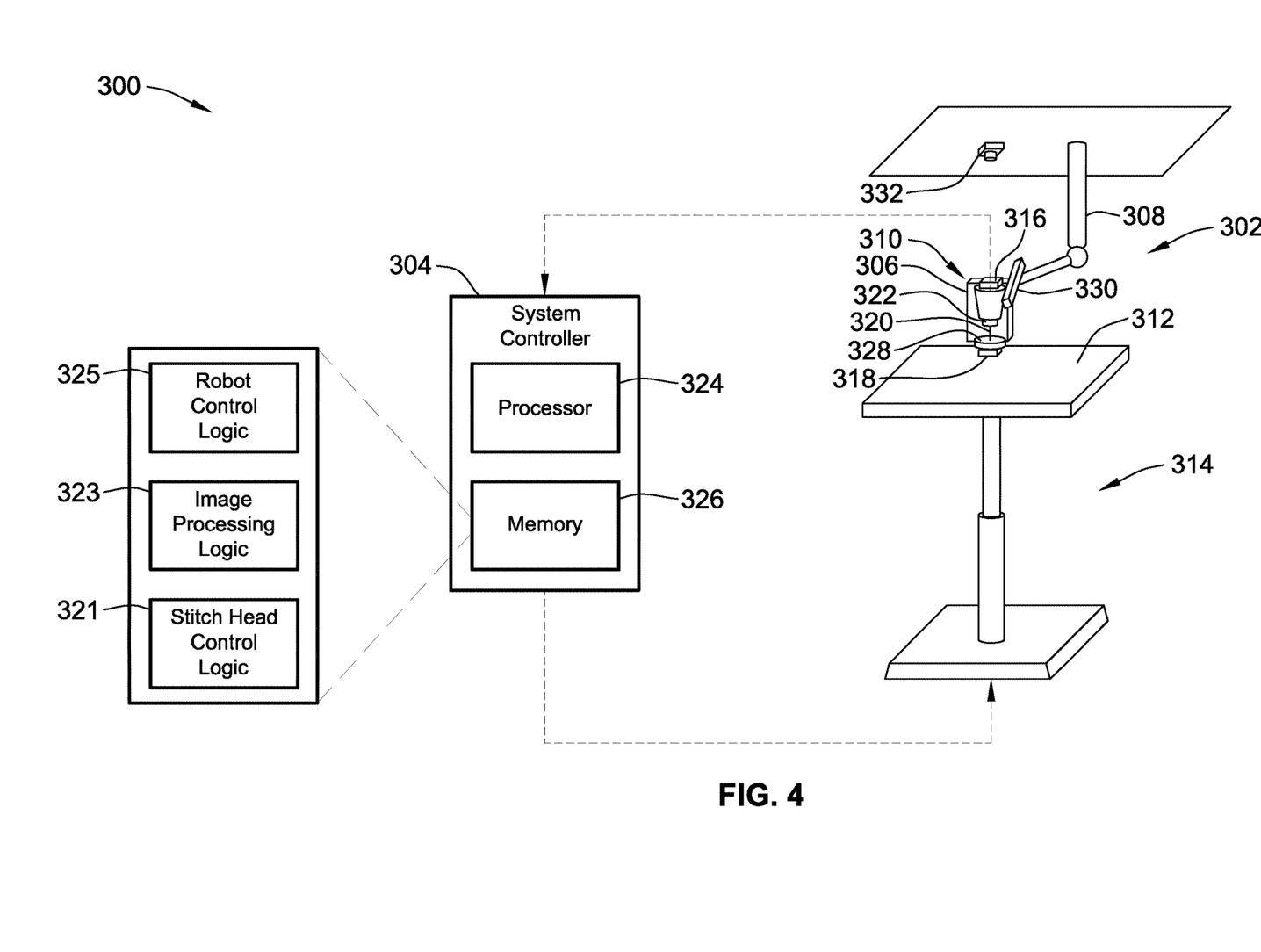
FIG. 4 is a schematic illustration of a representative automated manufacturing system for constructing engineered textiles from workpieces composed of unwoven, superposed wires in accord with aspects of the disclosed concepts.

Turning next to FIG. 4, there is presented an automated manufacturing system 300 for constructing an engineered textile product, such as the engineered textile 132 surface of footwear upper 112 of FIG. 2, from a workpiece composed of unwoven, superposed wires, such as workpiece 132' of FIG. 3. To remain pointed and succinct, only select components of the manufacturing system 300 have been shown and will be described in additional detail below. Nevertheless, the manufacturing systems and devices discussed herein may include numerous additional and alternative features, as well as other commercially available peripheral components, for example, to carry out the various protocols and algorithms of this disclosure. To this end, the automated manufacturing system 300 is portrayed in the Figures and described below as having a controller-automated, vision-guided robotic architecture; notwithstanding, the system 300 may take on other suitable architectures, including those using sensor-based automation and glide-track, carriage-borne precision movement.

Manufacturing system 300 uses sensor-based and/or vision-guided stitching to automate the construction of an engineered textile having a desired shape and a set of desired functional characteristics. The representative architecture of FIG. 4 employs a movable end effector, such as a wall, ceiling or floor mounted robotic stitching cell 302, that communicates, e.g., wired or wirelessly, with a robot system controller 304 that governs operation of the cell 302. The robotic stitching cell 302 includes a support frame 306 mounted to a distal end of an articulating robot arm 308. Alternative embodiments may utilize a movable end effector composed of a support carriage that is slidably mounted for multidirectional movement on a slide track frame (not shown). As will be described in further detail hereinbelow, the robotic stitching cell 302 is designed to selectively complete one or more stitching operations along one or more seam joint regions of one or more workpieces. Movement of the articulating robot arm 308 may be provided by means of servomotors, linear and rotational transducers, pneumatic actuators, hydraulic actuators, or by any other type of logically applicable actuation mechanism. In the same vein, the robot arm 308 may have six degrees of freedom of motion, as shown, or have any other suitable number of degrees of freedom of motion.

A processing head for joining superposed wires, such as stitching head 310, is mounted via the support frame 306 to the articulating robot arm 308 above a telescoping benchtop table 312 of a manufacturing system workstation 314. The processing head may take on various suitable formats, including a weld head for fusing the wires, an adhesive head for bonding the wires, a fastener head for mechanically joining the wires, etc. In accord with the illustrated example, the stitching head 310 includes a first (top) thread feeder 316 through which a metered length of a first (top) thread is selectively discharged. Mounted in opposing spaced relation to the first thread feeder 316 is a second (bottom) thread feeder, represented in FIG. 4 as a bobbin case 318, through which a metered length of a second (bobbin) thread is selectively discharged. A sewing needle 320 is received and operatively retained by a motor-actuated needle receiver 322. One or more integrated circuit (IC) processors 324 internal to robot system controller 304 execute stitch head control logic stored as a first control module 321 in resident memory device 326 to effectuate reciprocating motion (up-and-down translation in FIG. 4) of the sewing needle 320 via the needle receiver 322. A shuttle hook 328 juxtaposed with the needle 320 and needle receiver 322 is operable to create a lockstitch between the bobbin thread fed from the bobbin case 318 and the top thread fed from the top thread feeder 316.

As indicated above, robot system controller 304 is constructed and programmed to automate, among other things, the movement and operation of the manufacturing system 300. Control module, module, controller, control unit, electronic control unit, processor, and any permutations thereof may be defined to include any one or various combinations of one or more of logic circuits, Application Specific Integrated Circuit(s) (ASIC), electronic circuit(s), central processing unit(s) (e.g., microprocessor(s)), input/output circuit(s) and devices, appropriate signal conditioning and buffer circuitry, and other components to provide the described functionality, etc. Associated memory and storage (e.g., read only, programmable read only, random access, hard drive, tangible, etc.)), shown schematically at 326 in FIG. 4, whether resident, remote or a combination of both, store processor-executable software, firmware programs, modules, routines, etc., which are collectively represented at 321, 323 and 325.

Software, firmware, programs, instructions, routines, code, algorithms, and similar terms may be used interchangeably and synonymously to mean any processor-executable instruction sets, including calibrations and look-up tables. The system controller 304 may be designed with a set of control routines and logic executed to provide the desired functions. Control routines are executed, such as by a central processing unit, and are operable to monitor inputs from sensing devices and other networked control modules, and execute control and diagnostic routines to control operation of devices and actuators. Routines may be executed in real-time, continuously, systematically, sporadically and/or at regular intervals, for example, each 100 microseconds, 3.125, 6.25, 12.5, 25 and 100 milliseconds, etc., during ongoing use or operation of the system 300.

As shown in FIG. 4, the stitching head 310 carries a high-precision digital camera 330 (e.g., NAC MEMRECAM MX® Processing Optic) operable to capture, among other things, real-time digital images of a workpiece (e.g., workpiece 132' of FIG. 3). This digital camera 330 operates as a sensing device within a monitoring subsystem that is integrated into manufacturing system 300, and may include an actuator-driven autofocus device and a multifocal module for controller operation of the autofocus device. The digital camera 330 senses one or more objects and generates feedback data, detects respective locations of select sites with respect to each object, and subsequently sends location image signals back to an image processing logic within a second memory-stored module 323. The motorized autofocus device provides systematic precision focus upon the objects and displacement between designated sites, e.g., by being adjusted to be closer to and farther from each object/site. Image data generated by the digital camera 330 and processed through the image processing module 323 is passed to the stitch head control logic stored in the first control module 321 and robot control logic stored as a third control module 325 in resident memory device 326 to automate lockstitching together the unwoven, superposed wires of an engineered textile workpiece.

Figure 5:
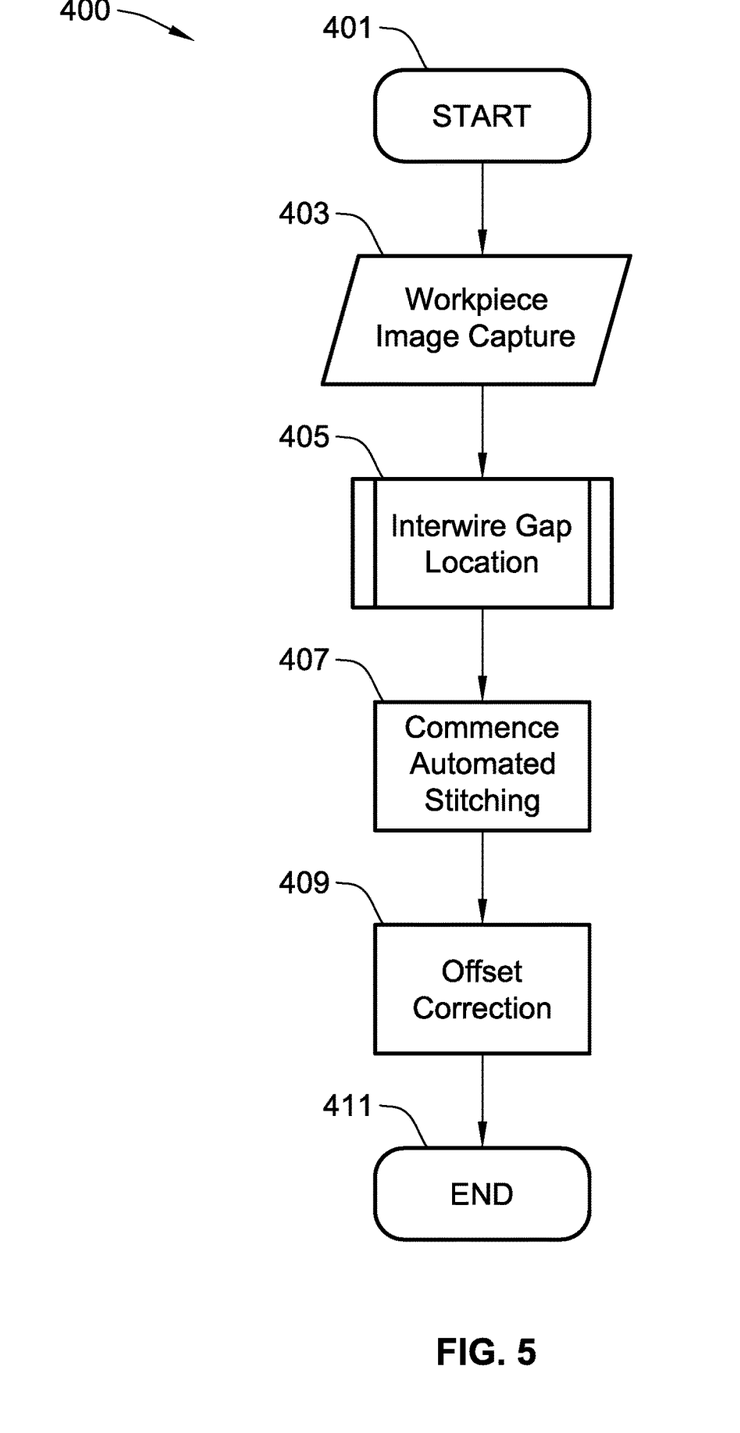
FIG. 5 is a flowchart illustrating a representative control algorithm with logic for controlling operation of an automated manufacturing system, which may correspond to memory-stored instructions executed by a resident or remote controller, control-logic circuitry, programmable electronic control unit, or other integrated circuit (IC) device or a network of IC devices in accord with aspects of the disclosed concepts.

With reference next to the flow chart of FIG. 5, an improved method or control strategy for automating operation of a manufacturing system, such as manufacturing system 300 of FIG. 4, to create an engineered textile product, such as engineered textile 132 of FIG. 2, from a workpiece, such as workpiece 132' of FIG. 3, is generally described at 400 in accordance with aspects of the present disclosure. Some or all of the operations illustrated in FIG. 5 and described in further detail below may be representative of an algorithm that corresponds to processor-executable instructions that may be stored, for example, in main or auxiliary or remote memory, and executed, for example, by an on-board or off-board controller, processing unit, control logic circuit, or other module or device or network of modules/devices, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 400 begins at terminal block 401 of FIG. 5 with processor-executable instructions for a programmable controller or control module or similarly suitable processor to call up an initialization procedure for a closed-loop control sequence with real-time stitch head guidance and adjustment during an automated stitching operation. Block 401 may initialize in response to a user prompt from a system operator or technician of the robotic stitching cell 302, or responsive to a broadcast prompt signal from a backend server-class computer or middleware computing node tasked with governing operation of a robotic cell, collection of robot cells, or a manufacturing facility incorporating therein one or more robot cells. To carry out this protocol, a control system or any combination of one or more subsystems may be operable to receive, process, and synthesize pertinent information and inputs, and execute control logic and algorithms to regulate various subsystems and/or subsystem components to achieve desired control targets. As part of initiating the method 400 at terminal block 401, an initial system setup may be carried out on the robotic stitching cell 302 through a suitable human machine interface (HMI), including powering on the various system components, calibrating an origin position, and identifying respective current locations of the stitch head and workpiece relative to this calibrated origin position.

Method 400 of FIG. 5 advances from terminal block 401 to input/output block 403 with processor-executable instructions for a control device, such as robot system controller 304, to exchange data with an image capture device, such as high-precision digital camera 330 of FIG. 4. Data generated by the image capture device may be indicative of a real-time captured image or set of images of a plan view and/or perspective view of a workpiece. At predefined process block 405, instructions are provided for the control device to analyze the captured workpiece image(s) and, through this evaluation, locate the interwire gaps within the quadrangles defined by the crisscrossed, superposed wires of the workpiece. By way of non-limiting example, robot system controller 304 of FIG. 4 may employ image processing module 323 stored within memory device 326 to: (1) process and filter the captured image of the workpiece (e.g., focusing, zooming, sharpening, edge detection, object detection, etc.); (2) scan the image to identify respective sets of two, three, or four intersecting points of the superposed wires that collectively define, in whole or in part, each quadrangle; (3) for each respective set of intersecting points, derive a center of a respective diagonal line segment that connects an opposing pair of the intersecting points (e.g., a geometric "diagonal" connecting opposite vertices of a polygon); and (4) designating the centers of the diagonal line segments of the intersecting point sets as the interwire gaps.

Accurate gap identification and location for provisioning vision-guided precision stitching may be achieved through various supplementary or alternative techniques to those described in the preceding section. For instance, robot system controller 304 may employ image processing module 323 to: (1) process and filter the captured workpiece image(s); (2) from these processed and filtered image(s), approximate a centerline or lateral edge line for each superposed wire; (3) construct the superposed wire quadrangles from these estimated centerlines/edge lines; and (4) designate a central region within each quadrangle between the estimated centerlines as one of the gaps. Optionally, robot system controller 304 may employ image processing module 323 to: (1) process and filter the captured image of the workpiece; (2) evaluate the processed and filtered workpiece image(s) to derive at least two wire intersecting points that define at least two respective corners on a common edge of each quadrangle; (3) determine, for each quadrangle, a central region defined at: (i) a calibrated angle from a line segment connecting the two respective corners, and (ii) a calibrated distance from one of the respective corners; and (4) categorize these central regions of the quadrangles as the interwire gaps.

Rather than identifying gap locations for each workpiece on an individualized basis, predefined process block 405 may provide product-specific routing instructions for processing a succession of workpieces intended to make multiples of a particular product. For instance, robot system controller 304 of FIG. 4 may lookup or otherwise retrieve from resident memory device 326 a customized set of pre-defined path plan instructions that have been mapped out for the stitching head to insert a succession of stitches within the gaps between the superposed wires. The foregoing path plan data may comprise, among other things, a stitch head start position or "origin," a stitch head end position or "destination," and a calibrated stitching route for moving the stitching head from the origin to the destination in order to insert the stitches at designated points along the route. Other path plan data may include stitch head speed, fore-aft pitch angle and rate, lateral pitch angle and rate, etc.

Once the system identifies the desired gap locations into which stitches will be inserted for mechanically interconnecting the superposed wires of the workpiece, method 400 proceeds to process block 407 and initiates automated stitching. To do so, robot system controller 304 may transmit one or more electronic command signals to the articulating robot arm 308 to sequentially move the stitching head 310 across the exposed face of the workpiece 132' and precisely align the sewing needle 320 with each of the quadrangle's internal gaps. The vision-based guidance system may be employed to ensure accurate alignment of the needle receiver 322 and shuttle hook 328 with respect to the interwire gaps prior to inserting a stitch. Process block 407 may also provide instructions that direct the robot system controller 304 to transmit one or more electronic command signals to the stitching head 310 to insert a succession of stitches within the gaps between the superposed wires.

Precision control of the automated stitching process may be further enabled through real-time position tracking of the stitching head 310. One or more optical position sensors 332 may be mounted at discrete locations of the robotic stitching cell 302 to determine real-time positions of the stitching head 310, e.g., relative to a calibrated origin position. Robot system controller 304 receives from the position sensor(s) 332 one or more sensor signals that are indicative of the real-time positions of the stitching head 310. If so desired, the system controller 304 may determine, from the received sensor signal(s) and the captured image(s) of the workpiece, an estimated distance between each real-time position of the stitching head 310 and a respective location of the next gap adjacent the stitching head's current position. Automated movement of the articulating robot arm 308 may include estimating a desired trajectory for moving the stitching head 310 from its current position to the location of the next gap based on the corresponding estimated distance between the stitching head and next adjacent gap. From the received sensor signal(s) and the captured workpiece image(s), the robot system controller 304 may also locate—one-at-a-time in real-time—the next adjacent gap that is closest to the current real-time position of the stitching head 310.

It may be desirable, for any of the above implementations, to make real-time adjustments to the stitching route parameters in order to accommodate part-to-part variations, manufacturing tolerances, inadvertent wire displacement, etc. This may include process block 409 providing instructions for the system controller to pull a trajectory trace of the stitch route, identifying start and end positions within a captured image of the workpiece, and superimposing the trace of the stitch route onto the captured image of the workpiece with the origin overlapping the start position and the destination overlapping the end position. After superimposing the trace onto the captured image, the system controller identifies one or more part-specific calibrated alignment points on the stitch route, and determines if there is any displacement between each calibrated alignment point and a corresponding alignment location in the image of the workpiece. If so, the system responsively determines and implements a respective trace correction to offset each respective displacement. Once the foregoing operations are completed, the method 400 of FIG. 5 may advance to terminal block 411 and terminate, or may loop back to terminal block 401 and run in a continuous loop.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, solid-state memory, a hard drive, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features. Additional features may be reflected in the following clauses:

Clause 1: an automated manufacturing system for constructing an engineered textile from a workpiece composed of superposed wires, the manufacturing system comprising: a movable end effector; a processing head mounted to the movable end effector; and a system controller operatively connected to the movable end effector and the processing head, the system controller being programmed to: determine a plurality of predefined joint locations of the superposed wires; command the movable end effector to sequentially move the processing head to align with each of the predefined joint locations; and command the processing head to join the superposed wires at the predefined joint locations to form the engineered textile.

Clause 2: a manufacturing system of clause 1, wherein the processing head includes a stitching head with a thread feeder and a sewing needle cooperatively configured to generate stitches.

Clause 3: a manufacturing system of clause 2, further comprising an image capture device mounted to the movable end effector and configured to capture an image of the workpiece and output data indicative thereof.

Clause 4: a manufacturing system of clause 3, wherein the system controller is further programmed to: receive, from the image capture device, the data indicative of the captured image of the workpiece, wherein determining the plurality of predefined joint locations includes locating, from the captured image of the workpiece, multiple gaps each defined between a quadrangle of the superposed wires, and wherein commanding the processing head to join the superposed wires includes commanding the stitching head to insert a succession of stitches within the gaps between the superposed wires.

Clause 5: a manufacturing system of clause 4, wherein the system controller is further programmed to: identify, within the captured image of the workpiece, respective sets of intersecting points of the superposed wires defining the quadrangles; and determine, within each of the respective sets, a center of a respective diagonal line segment connecting an opposing pair of the intersecting points, wherein locating the gaps includes designating the center of the diagonal line segment of each of the sets of intersecting points as one of the gaps.

Clause 6: a manufacturing system of clause 4, wherein the system controller is further programmed to: identify, within the captured image of the workpiece, an estimated centerline for each of the superposed wires; and construct the quadrangles of the superposed wires from the estimated centerlines, wherein locating the gaps includes designating a central region within each of the quadrangles between the estimated centerlines as one of the gaps.

Clause 7: a manufacturing system of clause 4, wherein the system controller is further programmed to: identify, within the captured image of the workpiece, two intersecting points of the superposed wires defining two respective corners for each of the quadrangles; and determine, for each of the quadrangles, a central region at a calibrated angle from a line segment connecting the two respective corners and at a calibrated distance from one of the respective corners, wherein locating the gaps includes designating the central region of each of the quadrangles as one of the gaps.

Clause 8: a manufacturing system of any one of clauses 1 to 8, wherein the system controller is further programmed to determine path plan data for moving the processing head to join the superposed wires at the predefined joint locations, the path plan data including an origin, a destination, and a joint route for traversing the processing head from the origin to the destination.

Clause 9: a manufacturing system of clause 8, wherein the system controller is further programmed to: generate a trace of the joint route; determine a start position and an end position within the captured image of the workpiece; and superimpose the trace of the joint route onto the captured image of the workpiece with the origin overlapping the start position and the destination overlapping the end position.

Clause 10: a manufacturing system of clause 9, wherein the system controller is further programmed to: determine a plurality of calibrated alignment points on the stitch route; determine a respective displacement, if any, between each of the calibrated alignment points and a respective alignment location in the image of the workpiece; and determine a respective trace correction to offset each of the respective displacements.

Clause 11: a manufacturing system of any one of clauses 1 to 10, further comprising a workpiece frame configured to retain the superposed wires in a tensioned, crisscrossed pattern.

Clause 12: a manufacturing system of clause 11, wherein the workpiece frame includes a plurality of adjoining casing walls defining an inner frame space across which the workpiece is stretched, and a series of posts projecting from the casing walls and spaced from one another along the perimeter of the inner frame space, the wires being wound around the posts.

Clause 13: a manufacturing system of any one of clauses 1 to 12, further comprising a position sensor configured to determine real-time positions of the processing head relative to a calibrated origin position and output sensor signals indicative thereof.

Clause 14: a manufacturing system of clause 13, wherein the system controller is further programmed to: receive, from the position sensor, the sensor signals indicative of the real-time positions of the processing head; and determine, from the received sensor signals and a captured image of the workpiece, an estimated distance between each of the real-time positions of the processing head and a next adjacent one of the joint locations; and estimate a plurality of desired trajectories each based on the estimated distance between the real-time position of the processing head and the respective next adjacent one of the joint locations.

Clause 15: a manufacturing system of clause 14, wherein the system controller is further programmed to determine, one-at-a-time in real-time from the received sensor signals and the captured image of the workpiece, the respective next adjacent one of the joint locations closest to each of the real-time positions of the stitching head.

Clause 16: a manufacturing system of any one of clauses 1 to 15, wherein the movable end effector includes a support frame attached to a robot arm.

Clause 17: a manufacturing system of any one of clauses 1 to 15, wherein the movable end effector includes a support carriage attached to a slide track frame.

Clause 18: an article of footwear for a foot of a user, the article of footwear comprising: a sole structure configured to support thereon the foot of the user; and an upper attached to the sole structure and configured to attach to the foot of the user, the upper including an upper segment fabricated from an engineered textile, the engineered textile including: a first set of mutually parallel wire windings elongated in a first direction; a second set of mutually parallel wire windings elongated in a second direction distinct from the first direction, the second set of wire windings abutting the first set of wire windings in an unwoven, intercrossed pattern, wherein the abutting first and second sets of wire windings are joined at a plurality of predefined joint locations.

Clause 19: an article of footwear of clause 18, wherein the unwoven, intercrossed pattern defines a plurality of quadrangles with central gaps, and wherein the article of footwear further comprises first and second threads elongated in a third direction parallel with respect to the first direction, wherein the first and second threads are lockstitched together in the central gaps between the intercrossed wires.

Clause 20: a non-transitory, computer-readable medium storing instructions for execution by one or more processors of a system controller of an automated manufacturing system, the instructions causing the automated manufacturing system to perform operations comprising: receiving, from an image capture device mounted to a movable end effector, data indicative of a captured image of a workpiece, the workpiece being composed of multiple unwoven, superposed wires, the movable end effector having mounted thereto a stitching head with a thread feeder and a sewing needle cooperatively configured to generate stitches; locating, from the captured image of the workpiece, multiple gaps each defined between a quadrangle of the superposed wires; command the movable end effector to sequentially move the stitching head and thereby align the sewing needle with each of the gaps; and command the stitching head to insert a succession of stitches within the gaps between the superposed wires.

Clause 21: a method of operating an automated manufacturing system, the method comprising: receiving a workpiece composed of superposed wires; determining, via a system controller, a plurality of predefined joint locations for the superposed wires; commanding, via the system controller, a movable end effector to sequentially move a processing head to thereby align the processing head with each of the predefined joint locations; and commanding, via the system controller, the processing head to join the superposed wires at the predefined joint locations to form an engineered textile.

Clause 22: a method of clause 21, further comprising receiving, via the system controller from an image capture device, data indicative of a captured image of the workpiece.

Clause 23: a method of clause 21 or clause 22, wherein the processing head includes a stitching head with a thread feeder and a sewing needle cooperatively configured to generate stitches.

Clause 24: a method of clause 23, wherein the stitching head further includes a needle receiver operable to reciprocally translate the sewing needle, a bobbin case operable to feed bobbin thread, and a shuttle hook operable to create a lockstitch between the bobbin thread and a top thread fed from the thread feeder.

Clause 25: a method of any one of clauses 22 to 24, wherein determining the predefined joint locations for the superposed wires includes locating, via the system controller from the captured image of the workpiece, multiple gaps each defined between a quadrangle of the superposed wires, and wherein commanding the processing head to join the superposed wires at the predefined joint locations includes commanding, via the system controller, the stitching head to insert a succession of stitches within the gaps between the superposed wires.

Clause 26: a method of clause 24, further comprising: identifying, within the captured image of the workpiece, respective sets of intersecting points of the superposed wires defining the quadrangles; and determining, within each of the respective sets, a center of a respective diagonal line segment connecting an opposing pair of the intersecting points, wherein locating the gaps includes designating the center of the diagonal line segment of each of the sets of intersecting points as one of the gaps.

Clause 27: a method of clause 24, further comprising: identifying, within the captured image of the workpiece, an estimated centerline for each of the superposed wires; and constructing the quadrangles of the superposed wires from the estimated centerlines, wherein locating the gaps includes designating a central region within each of the quadrangles between the estimated centerlines as one of the gaps.

Clause 28: a method of clause 24, further comprising: identifying, within the captured image of the workpiece, two intersecting points of the superposed wires defining two respective corners for each of the quadrangles; and determining, for each of the quadrangles, a central region at a calibrated angle from a line segment connecting the two respective corners and a calibrated distance from one of the respective corners, wherein locating the gaps includes designating the central region of each of the quadrangles as one of the gaps.

Clause 29: a method of any one of clauses 21 to 29, further comprising determining path plan data for moving the processing head to join the superposed wires at the predefined joint locations, the path plan data including an origin, a destination, and a route for traversing the processing head from the origin to the destination.

Clause 30: a method of clause 29, further comprising: generating a trace of the route; determining a start position and an end position within the captured image of the workpiece; and superimposing the trace of the route onto the captured image of the workpiece with the origin overlapping the start position and the destination overlapping the end position.

Clause 31: a method of clause 30, further comprising: identifying a plurality of calibrated alignment points on the route; determining a respective displacement, if any, between each of the calibrated alignment points and a respective alignment location in the image of the workpiece; and determining a respective trace correction to offset each of the respective displacements.

Clause 32: a method of any one of clauses 21 to 31, wherein the automated manufacturing system further includes a workpiece frame, the method further comprising locating the superposed wires in a tensioned, crisscrossed pattern in the workpiece frame.

Clause 33: a method of clause 32, wherein the workpiece frame includes a plurality of adjoining casing walls defining an inner frame space, and a series of posts projecting from the casing walls and spaced from one another along the perimeter of the inner frame space, and wherein locating the superposed wires includes winding the wires around the posts such that the workpiece is stretched across the inner frame space.

Clause 34: a method of any one of clauses 21 to 33, wherein the automated manufacturing system further includes a position sensor, the method further comprising receiving, via the system controller from the position sensor, sensor signals indicative of real-time positions of the processing head relative to a calibrated origin position.

Clause 35: a method of clause 34, further comprising determining, from the received sensor signals and the captured image of the workpiece, an estimated distance between each of the real-time positions of the processing head and a next adjacent one of the joint locations, wherein commanding the movable end effector to move the processing head includes estimating a plurality of desired trajectories each based on the estimated distance between the real-time position of the processing head and the respective next adjacent one of the joint locations.

Clause 36: a method of clause 35, further comprising determining, one-at-a-time in real-time from the received sensor signals and the captured image of the workpiece, the respective next adjacent one of the joint locations closest to each of the real-time positions of the processing head.

Clause 37: a method of clause 21, wherein the movable end effector includes a support frame attached to a robot arm or a support carriage attached to a slide track frame.

What is claimed:

1. A method of constructing an engineered textile from a workpiece composed of superposed wires, the method comprising:
   receiving, via a system controller from an image capture device, image data indicative of a captured image of the workpiece;
   determining, via the system controller from the captured image of the workpiece, a plurality of joint locations for the superposed wires, the determining including locating multiple wire gaps each defined between a respective quadrangle of the superposed wires;
   commanding, via the system controller, a movable end effector to move a processing head attached to the movable end effector to thereby sequentially align the processing head with each of the joint locations, the processing head including a stitching head with a thread feeder and a sewing needle cooperatively configured to generate stitches; and
   commanding, via the system controller, the processing head to join the superposed wires at the joint locations to form the engineered textile, the joining including the stitching head inserting a succession of stitches within the wire gaps between the superposed wires.

2. The method of claim 1, wherein the stitching head further includes a needle receiver, a bobbin case, and a shuttle hook, the method further comprising:
   commanding the needle receiver to reciprocally translate the sewing needle;
   commanding the bobbin case to feed a bobbin thread; and
   commanding the shuttle hook to create a lockstitch between the bobbin thread and a top thread fed from the thread feeder.

3. The method of claim 1, wherein the image capture device is mounted to the movable end effector, the method further comprising capturing, via the image capture device, multiple images of the workpiece during movement of the movable end effector.

4. The method of claim 1, further comprising:
   identifying, via the system controller within the captured image of the workpiece, respective sets of intersecting points of the superposed wires defining the quadrangles; and
   determining, within each of the respective sets, a center of a respective diagonal line segment connecting an opposing pair of the intersecting points, wherein locating the wire gaps includes designating the center of the diagonal line segment of each of the sets of intersecting points as one of the wire gaps.

5. The method of claim 1, further comprising:
identifying, via the system controller within the captured image of the workpiece, an estimated centerline for each of the superposed wires; and
constructing the quadrangles of the superposed wires from the estimated centerlines,
wherein locating the wire gaps includes designating a central region within each of the quadrangles between the estimated centerlines as one of the wire gaps.

6. The method of claim 1, further comprising:
identifying, via the system controller within the captured image of the workpiece, two intersecting points of the superposed wires defining two respective corners for each of the quadrangles; and
determining, for each of the quadrangles, a central region at a calibrated angle from a line segment connecting the two respective corners and at a calibrated distance from one of the respective corners,
wherein locating the wire gaps includes designating the central region of each of the quadrangles as one of the wire gaps.

7. The method of claim 1, further comprising determining, via the system controller, path plan data for moving the processing head to join the superposed wires at the joint locations, the path plan data including an origin, a destination, and a joint route for traversing the processing head from the origin to the destination.

8. The method of claim 7, further comprising:
generating a trace of the joint route;
determining a start position and an end position within the captured image of the workpiece; and
superimposing the trace of the joint route onto the captured image of the workpiece with the origin overlapping the start position and the destination overlapping the end position.

9. The method of claim 8, further comprising:
determining a plurality of calibrated alignment points on the joint route;
determining a respective displacement, if any, between each of the calibrated alignment points and a respective alignment location in the image of the workpiece; and
determining a respective trace correction to offset each of the respective displacements.

10. The method of claim 1, further comprising winding first and second layers of stretchable wire strands around a workpiece frame to define the superposed wires.

11. The method of claim 10, wherein the workpiece frame includes a plurality of adjoining casing walls defining an inner frame space across which the first and second layers of stretchable wire strands are stretched, and a series of posts projecting from the casing walls and spaced from one another along the perimeter of the inner frame space, the wire strands being wound around the posts to retain the superposed wires in a tensioned, crisscrossed pattern.

12. The method of claim 1, further comprising determining, via the system controller using sensor signals received from a position sensor, real-time positions of the processing head relative to a calibrated origin position.

13. The method of claim 12, further comprising:
receiving, via the system controller from the position sensor, the sensor signals indicative of the real-time positions of the processing head;
determining, from the received sensor signals and the captured image of the workpiece, an estimated distance between each of the real-time positions of the processing head and a next adjacent one of the joint locations; and
estimating a plurality of desired trajectories each based on the estimated distance between the real-time position of the processing head and the respective next adjacent one of the joint locations.

14. The method of claim 13, further comprising determining, one-at-a-time in real-time via the system controller from the received sensor signals and the captured image of the workpiece, the respective next adjacent one of the joint locations closest to each of the real-time positions of the stitching head.

15. The method of claim 1, wherein the movable end effector includes a support frame attached to a robot arm.

16. The method of claim 1, characterized by a lack of weaving steps and a lack of knitting steps for constructing the engineered textile.

17. The method of claim 1, further comprising stretching the superposed wires across a workpiece frame to form an intercrossed array of unwoven and unknitted wire windings.

18. The method of claim 1, wherein the superposed wires include first and second wire strands each formed from an aliphatic or semi-aromatic polyamide material, an aromatic polyester material, an aramid material, a polypropylene material, and/or a polyethylene material.

19. A method of constructing an engineered textile from a workpiece composed of superposed wires, the method comprising:
determining, via a system controller, a plurality of joint locations for the superposed wires;
determining path plan data for moving a processing head attached to a movable end effector to join the superposed wires at the joint locations, the path plan data including an origin, a destination, and a joint route for traversing the processing head from the origin to the destination;
generating a trace of the joint route;
determining a start position and an end position within a captured image of the workpiece;
superimposing the trace of the joint route onto the captured image of the workpiece with the origin overlapping the start position and the destination overlapping the end position;
commanding, via the system controller, the movable end effector to sequentially move the processing head to align the processing head with each of the joint locations; and
commanding, via the system controller, the processing head to join the superposed wires at the joint locations to form the engineered textile.

20. A method of constructing an engineered textile from a workpiece composed of superposed wires, the method comprising:
determining, via a system controller, a plurality of joint locations for the superposed wires;
commanding, via the system controller, a movable end effector to sequentially move a processing head attached to the movable end effector to thereby align the processing head with each of the joint locations;
receiving, via the system controller from a position sensor, sensor signals indicative of real-time positions of the processing head;
determining, via the system controller from the received sensor signals and a captured image of the workpiece, an estimated distance between each of the real-time positions of the processing head and a next adjacent one of the joint locations;

estimating a plurality of desired trajectories each based on the estimated distance between the real-time position of the processing head and the respective next adjacent one of the joint locations; and commanding, via the system controller, the processing head to join the superposed wires at the joint locations to form the engineered textile.

\* \* \* \* \*